PATENTED MAR 21 1972

BURTON VER NOOY
INVENTOR.

BY Hyer Eichenwalt
& Thompson

ATTORNEYS

United States Patent

Ver Nooy

[15] 3,649,983
[45] Mar. 21, 1972

[54] PIPELINE PIG

[72] Inventor: Burton Ver Nooy, Tulsa, Okla.

[73] Assignee: T. D. Williamson, Inc., Tulsa, Okla.

[22] Filed: May 4, 1970

[21] Appl. No.: 34,171

[52] U.S. Cl. .................................................15/104.06 R
[51] Int. Cl. ..........................................................B08b 9/04
[58] Field of Search ..........15/3.5, 3.51, 104.06 R, 104.06 A; 137/802, 268

[56] References Cited

UNITED STATES PATENTS 3,041,204   6/1962   Green......................15/104.06 R UX
2,445,645   7/1948   Stephens..................15/104.06 R UX
3,074,436   1/1963   En Dean....................15/104.06 R X Primary Examiner—Edward L. Roberts
Attorney—Hyer, Eickenroht, Thompson and Turner

[57] ABSTRACT

A pipeline pig adapted to be propelled through a pipeline by fluid flowing therethrough wherein the pig has two spaced apart body supporting sections at least one of which has a curved or spherical surface which limits fluid flow past the pig when the pig is traversing a sharp bend (e.g., a 1.5 radius ell) in the pipeline.

5 Claims, 4 Drawing Figures

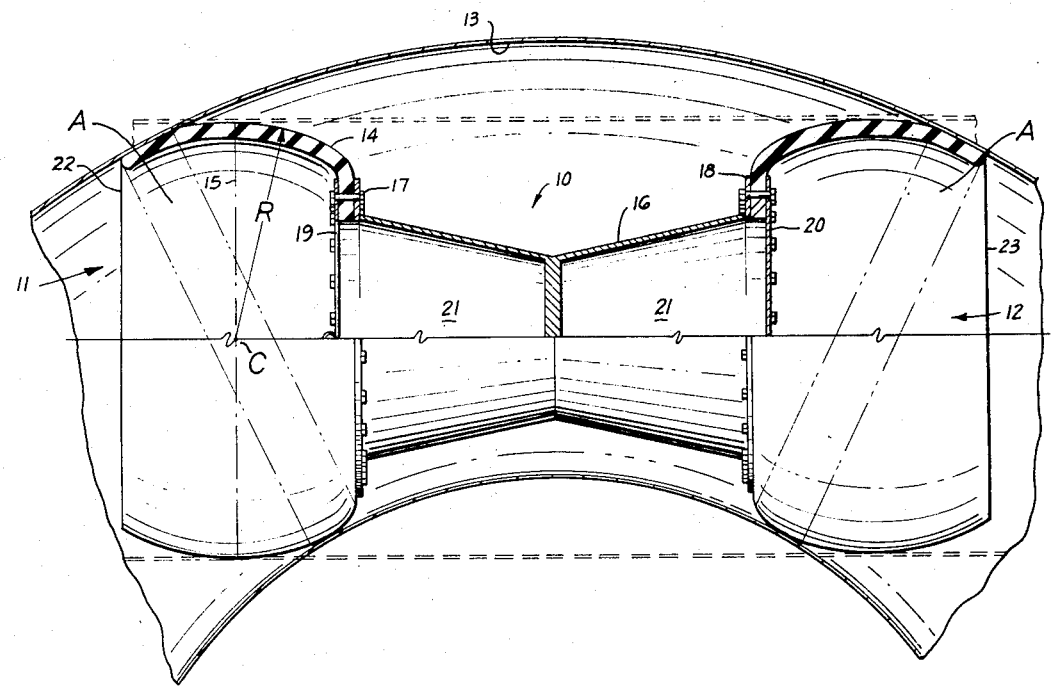

BURTON VER NOOY
INVENTOR.

BY
ATTORNEYS

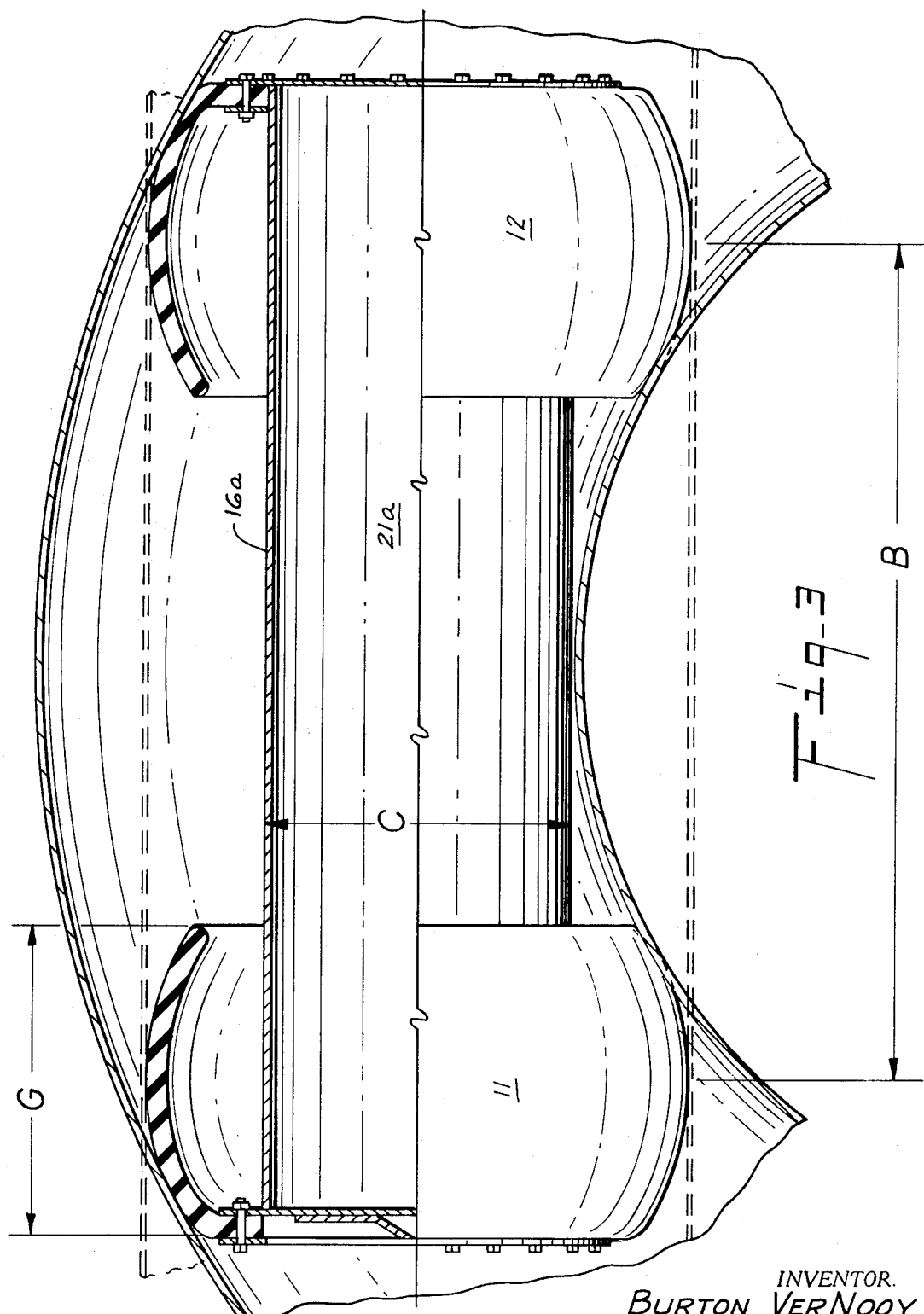

###PIPELINE PIG

This invention relates to a pipeline pig especially adapted to traverse pipelines having straight and curved sections wherein the curved section can be a relatively sharp bend. In one of its aspects, it relates to such a pig which affords an improved flexibility of design.

In the past, pipeline pigs of a large variety of designs have been suggested for various uses in pipelines. Among such uses are the cleaning and scraping of the interior of the pipeline, water and condensate removal from a gas pipeline, maintaining separation between successive batches of different products in a products pipeline, etc. Different uses of the pigs often dictate differing design criteria. For example, a batch separation pig should desirably require a minimum pressure differential across it to propel it along the pipeline in order to minimize intermixing of the batches of products separated by the pig. One way of accomplishing this is to design the pig so that it has a large displacement of pipeline fluid and therefore tends to "float" in the fluid with a minimum of support by the pipeline itself. In addition to the "use" design factors, there are other factors which affect the design of the pig. For example, the passage of the pig through valves and past side outlets (e.g., a branch connection to the pipeline) or other discontinuities in the inner pipeline wall make it desirable that the spacing between the fore and aft sealing cups or supporting elements be sufficient to span the valve or the side outlet. If the spacing is too short, both the fore and aft cups may encounter the discontinuity at the same time and become ineffective at the same time to maintain a desired seal with the pipeline walls thereby permitting pipeline fluid to bypass the pig and perhaps causing it to stop in the line. Another factor which is becoming of greater significance is the sharpness of the bends in the pipeline which the pig must traverse. The newer pipelines are being designed which use sharp bends to reduce right-of-way costs and to provide a certain amount of flexibility in design regardless of geographic considerations. For construction economy, it is often desirable to use prefabricated elbows or bends instead of bending pipe in the field. Moreover the trend today is to high strength line pipe and it is more desirable from a safety standpoint to use welding ells than to put critical bends in the pipe. As a result of all of these considerations, welding elbows are becoming a more accepted part of both gas and oil pipeline design. Even if only used in small numbers, they present a limitation; one elbow per pipeline pig run means that a pig must be used which will safely traverse that ell. One such welding elbow which is finding increasing use is the so called 1.5 radius elbow. Such an elbow is one whose curvature at its centerline is 1.5 times the nominal pipe size of the pipe with which the elbow is to be used. In order for conventional pigs to even theoretically traverse such short radius ells, it would be necessary to space the fore and aft sealing cups so closely together, in order to maintain a seal while the pig was traversing the bend, that the pig would tend to become unstable and its tendency to hang-up valves and side openings would increase excessively. To further explain the problem of maintaining a seal with a conventional pig having fore and aft sealing cups, it will be appreciated that when such a pig is in a straight section of pipeline, each cup provides a sealing zone at its lip which extends around the periphery of the pipeline; i.e., the sealing zone is circular and lies in a plane which is normal to the axis of the pipeline. However when such a pig encounters a sharp bend, such as a 1.5 radius ell, the sealing zones offered by the cup lips not only remain circular but are disposed in a plane which is at an acute angle with respect to the curved centerline of the ell. Therefore, the cups with lips which are designed to provide circular sealing zones are effectively disposed so that they are attempting to seal in a cross section which is effectively elliptical. The sharper the bend, the longer will be the major axis of the ellipse and the greater will be the bypass area around the pig. In short, the problem is that the pipeline is bent too sharply to accommodate the pig which is designed primarily for use in straight sections of the pipeline.

It is an object of this invention to provide a pipeline pig which can successfully traverse relatively sharp bends or curves in the pipeline and yet which can be made long enough to be stable in its operation and to successfully traverse valves, side openings and other discontinuities in the pipeline.

Another object is to provide such a pig which not only has such capabilities but also has a flexibility of design such that its displacement of pipeline fluid can be varied over a considerable range to obtain various degrees of "floatability" of the pig or to provide for various configurations and dimensions of the pig's central body for various purposes.

Another object of the invention is to provide a pipeline pig having a supporting element which in cooperation with the pipeline provides a zone between the element and the pipeline of restricted flow past the pig which zone shifts in its angular position with respect to the pig as the pig traverses a curved portion of the pipeline so that the effective flow restricting zone of the element remains circular in configuration as the element traverses the curve, thereby preventing excessive bypass of fluid past the element while at the same time permitting the element to remain in essentially its original configuration.

Another object is to provide such a pig which is bidirectional in that its endwise orientation in the pipeline does not affect its movability therethrough.

Other objects, advantages and features of the invention will be apparent to one skilled in the art upon a consideration of the specification, the claims and the appended drawings wherein:

FIG. 3 illustrates another embodiment of the pig of this invention traversing a 1.5 radius ell in a pipeline.

Figures 1, 4:
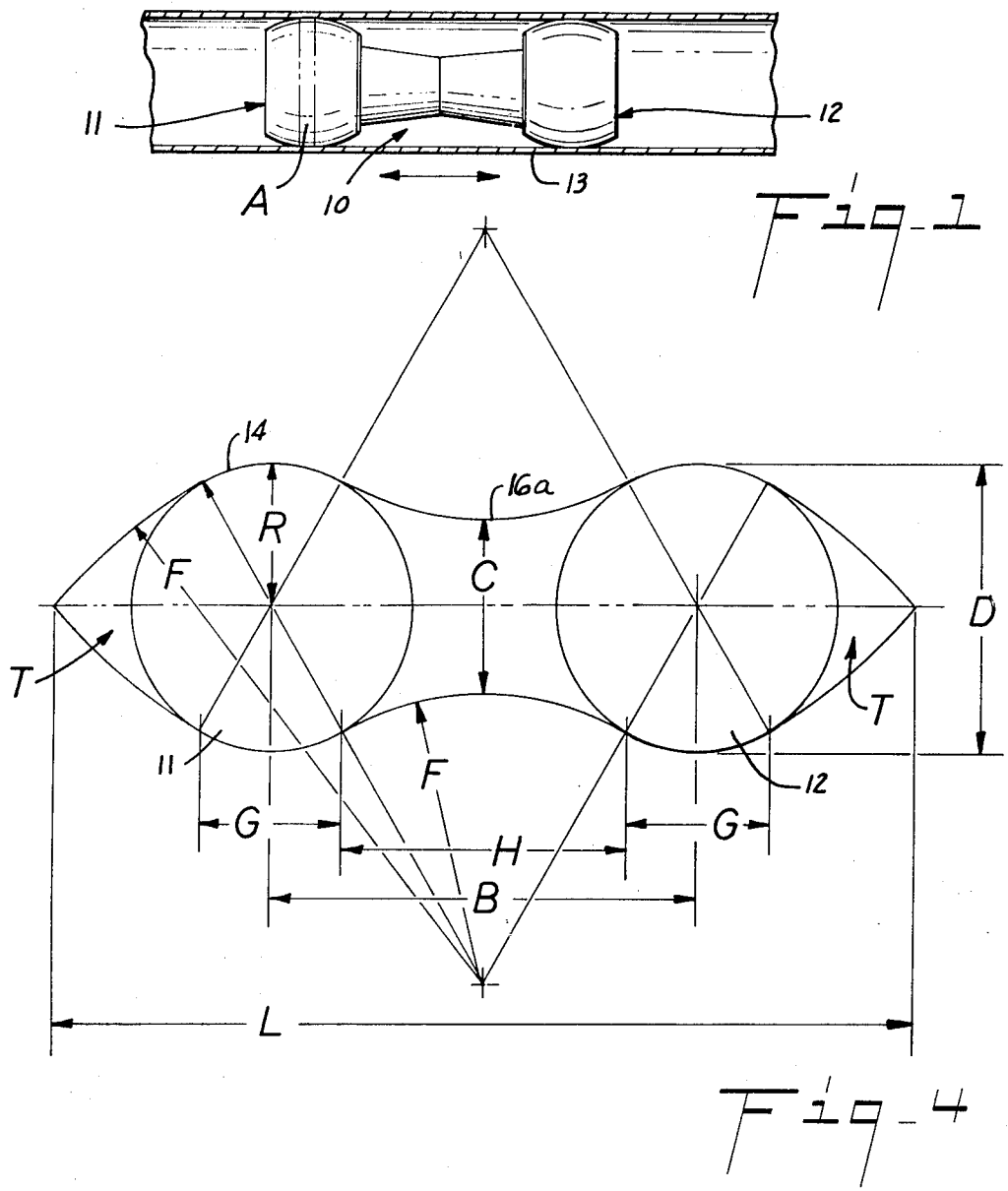
FIG. 1 is a general elevational view of one form of pig made in accordance with this invention showing the pig in a pipeline.
FIG. 4 is a geometric representation which will be used in connection with explaining certain design parameters indicative of the flexability of the design of the pig of this invention.
Figure 2:
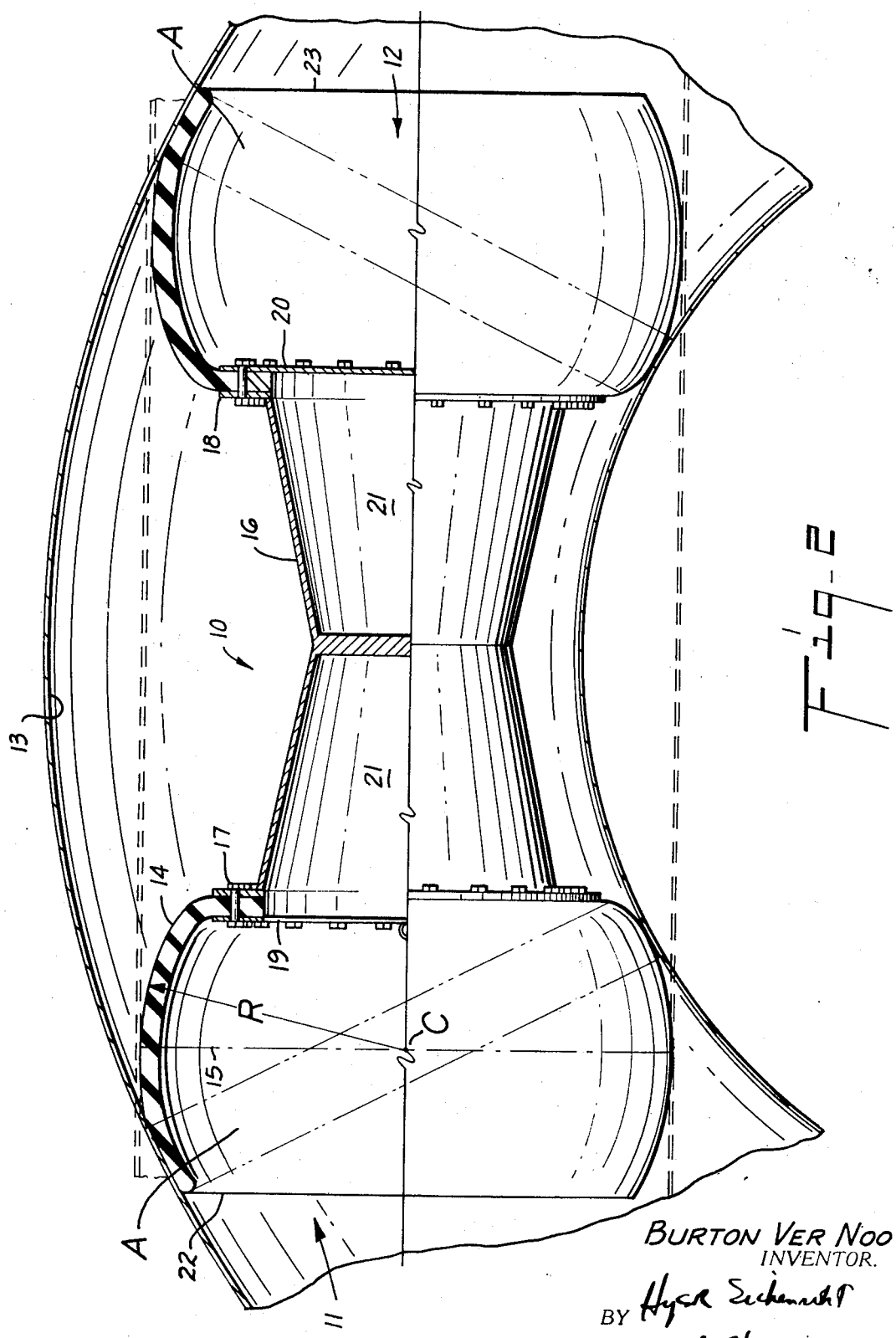
FIG. 2 shows the pig of FIG. 1, in partial section and elevation, as it traverses a sharp bend or curve in a pipeline.

Referring to FIGS. 1 and 2, this particular embodiment is shown as including a body 10 having two longitudinally spaced portions 11 and 12 which are adapted to engage a wall of a pipeline 13 when the pig is inserted thereinto in order to support the entire pig in the pipeline. One, and preferably both of the enlarged portions have an additional function, namely, to obstruct flow of fluid past the pig sufficiently that fluid flowing through the pipeline will propel the pig therealong. Thus at least one of the portions should be, in the above sense, a sealing element and should have an outer circumferential face 14 in the shape of a partial sphere with portions of the face lying to both sides of a plane 15 normal to the longitudinal axis of the pig and extending through the center C about which face 14 is struck on a radius R. Desirably, the radius R is substantially equal to one-half of the inside diameter of the pipeline although this can be varied as discussed below.

With the foregoing construction, it can be seen that when the pig is moving through a straight section of pipeline (FIG. 1) the sealing elements 11 and 12 will engage the walls of the pipeline about most or all of the periphery of the sealing elements to provide that which, for the purposes of describing a preferred embodiment, will be termed a sealing zone A. Thus with the pig in the straight section of the pipeline sealing zone A will lie in a plane normal to both the longitudinal axis of the pig and the longitudinal axis of the pipeline. However, when the pig enters a curved section of the pipeline, as shown in FIG. 2, this sealing zone A shifts its angular relationship to the longitudinal axis of the pig but substantially maintains it with respect to the longitudinal axis of the curved section of the pipeline. Thus the sealing zone can shift its orientation with respect to the pig body depending upon the curved configuration of the pipeline and will at all times maintain the desired seal or flow restriction with respect to the pipeline. In those cases where a second sealing element 12 is provided at the other end of the pig, the zone A is provided in a like manner but its shifting and angular position will be opposite that to the shifting of the zone in the forward sealing element.

It will be appreciated that zone A can at least in theory be essentially a line but in practice where the sealing elements are made slightly oversize, it will have a finite width which perhaps has been exaggerated in the drawings for purposes of illustration. Also, the zone may vary in width along its circumferential length and further dependent upon its angular position depending on a number of factors including manufacturing tolerances, cross-sectional configuration of the pipeline, etc.

In a preferred form, the spaced portions 11 and 12 are each a section of the hollow sphere so fashioned that the portions of face 14 providing the effective zone A for peripheral contact with the inner pipeline wall extends substantially equidistant to either side of plane 15. The extent of face 14 will depend upon a number of factors as will be more apparent from the discussion below but the preferred form as shown in FIGS. 2 and 3 can be termed an element or a member which is essentially a double truncated sphere, i.e., a sphere having opposite portions truncated.

The spaced portions or sealing elements 11 and 12 are joined together by a central portion 16 of the body. In the embodiment of FIG. 2, the central body portion is shown as terminating in flanges 17 and 18 which cooperate with plates 19 and 20 to provide a means for bolting or attaching the sealing members to the central body portion. Plates 19 and 20 can be made imperforate as shown in order to provide spaces 21 in the central body portion which are sealed from intrusion of a pipeline fluid thereby giving the pig body an added displacement resulting in an increased "buoyancy" which tends to decrease the amount of its weight which must be supported by the pipeline. This in turn reduces the frictional engagement between the sealing elements and the pipeline thereby making the pig more easily propellable through the pipeline.

In the embodiment of FIG. 2 the central body portion 16 is connected to the spherical sections 11 and 12 in such a manner that the free ends 22 and 23 of the spherical sections extend in opposite directions from each other. This type of arrangement may be desirable where one wishes to obtain a maximum spacing between the sealing elements with a minimum length of the inner body portion 16. This increased spacing tends to give the pig greater stability as it moves through the pipeline and it also permits the pig to pass through valves, across side openings and other discontinuities in the pipeline with greater reliability and ease. For example, it is desirable that when a pig encounters a discontinuity in a pipeline, such as a side opening, that the forward sealing element be entirely across the side opening to encounter the normally configured pipeline on the other side thereof before the aft sealing element encounters the side opening. This assures that one or the other sealing element is always providing a suitable seal or "piston" across the pipeline to minimize fluid bypassing of the pig while it is passing across the side opening. Also, with the greater spacing, should the pig tend to move into the side opening when one of its elements is passing thereacross, and such movement will be more limited with the longer spacing thereby making it easier for the pig to be properly reoriented in the pipeline.

Referring to FIG. 3, another embodiment having sealing elements similar to those shown in FIG. 2 is illustrated. However these sealing elements are arranged so that their free ends face toward each other and so that the central body portion 16a extends into the interiors of both sealing elements. This type of arrangement can be employed where it is desired to have a maximum length of central body portion 16a for any given spacing between the sealing elements. Then by making the inner body portion of a substantial diameter, the sealed space 21a can likewise be increased for such purposes as giving added buoyancy to the pig.

Referring to FIG. 3, it can be visualized that as the spacing B between the sealing elements is decreased, the maximum lateral dimension, in this case the outside diameter C, of the central body portion 16a can be made larger and still avoid the central body portion rubbing against the inside wall of the pipeline as the pig passes around a curved section. This closer spacing of the sealing elements may be desired where, for some reason, the diameter of the central body portion is to be increased toward a maximum. However, generally, the spacing B is also affected by the desired stability of the pig in the pipeline and the discontinuities, such as valves and side openings, to be encountered in the pipeline. Where these latter factors are dominant, the spacing B can be made quite long in which event the body diameter C is considerably reduced so that the stability of the pig is greatly increased without affecting its flexibility. It can also be seen that as spacing B increases for any given radius of curvature of the pipeline, the effective equatorial area of the sealing elements should also be increased, i.e., the dimension G should increase.

Referring now to FIG. 4, factors other than those discussed above affecting the pig's design and contributing to its flexibility of design will now be discussed. While the cylindrical inner body portion 16a can be increased in diameter to increase the volumetric capacity of the inner body portion, the space between the spherical faces 14 can be more completely utilized to provide the greatest volume and the smoothest transition by employing a shape as shown in FIG. 4. In this figure, the minimum curvature of the central body portion is determined by radius E which is the radius about which the inside wall of the ell having the shortest radius of curvature is struck. Preferably, the dimension C will have a maximum value at a point midway between the centers of the two spherical sections which is less than the curvature of the ell struck on the radius E to assure that the inner body portion does not come into rubbing contact with the pipe wall.

The supporting or sealing elements of the pig can terminate as shown in FIGS. 2 and 3 if pig support and sealing are the only considerations. However, for maximum volume and displacement, the terminations may be extended as indicated in FIG. 4. Thus the extensions or terminations T can be defined as a shape such as to be within the range of configurations developed by rotation of a line tangent with the spherical surface 14 and having a radius of curvature not greater than the radius of curvature of the curved section of the pipeline at the outermost wall thereof. This radius of curvature is shown as F in FIG. 4 and defines the shape for the nose and tail sections or terminations of the pig having a maximum volume within the permissable limitations of the curved pipeline section. It will be appreciated that these terminations or extensions can be of conical or other shapes such as to approach the maximum volume for the curved terminations as shown in FIG. 4.

The terminations T have another advantage other than increasing the displacement of the pig. This additional advantage is to provide a greater overall pig length with positive guidance means at each end of the pig so as to facilitate passage of the pig across discontinuities in the pipeline and to aid its passage past check valves. Thus, for example, should the forward end of the pig for some reason tend to move out into a side opening, one edge of the side opening will be contacted by the forward extension T which, due to its configuration, will tend to move the forward end of the pig back into the pipeline with a smooth motion having a minimum effect upon the spherical portion of the element 11. Also, the terminations T have a "nose" at substantially the longitudinal axis of the pig and forwardly a sufficient distance so the nose will engage a check valve element and provide a smoother opening thereof as the pig moves through the check valve.

It will also be seen that the embodiment of FIG. 4 provides a pig of a streamline shape. Thus the pig has a central body portion which is smaller than the enlargements and is also provided on each side of the enlargements with tapering sections which merge smoothly with the enlargements or spherical sections. This streamline shape may be particularly advantageous when the radius R is to be made somewhat less than one-half the inside diameter of the pipeline. In a pig so dimensioned, the spherical sections do not act as positive seals with the inner wall of the pipeline but rather, in cooperation with the pipeline, to restrict flow past the pig to a desired value but one which is still insufficient to cause the pig to stop in the pipeline. One such application may be the removal of water or other liquids from a gas line. On occasions, water or other liquid will gather at low spots in the pipeline and a pig is passed through the pipeline to remove the water and other liquids. In such cases, in order to minimize contact of the pig with the pipeline wall, it can be made with the spherical sections smaller than the pipeline so that the gas is steadily bypassed around the pig as it moves along the pipeline. The bypassed gas is insufficient to cause the pig to stop in the pipeline and yet is such that its velocity past the spherical portions will be high enough to blow the water or other liquid along in front of the pig.

In order to illustrate the interdependence of certain dimensions of the pig of FIG. 4 upon other dimensions, the following table of various dimensions is given for a 1.5 radius ell and for a dimension B as shown in the table. From this, it will be noted among other things, that volumetric displacement of the pig increases somewhat as the overall length of the pig increases.

| B = 1.50 D | B = 1.75 D | B = 2.00 D | B = 2.236 D |
|---|---|---|---|
| C = 0.598 D | C = 0.437 D | C = 0.236 D | C = 0 |
| D = pipe diameter* | | | |
| E = 1.00 D | E = 1.00 D | E = 1.00 D | E = 1.00 D |
| F = 2.00 D | F = 2.00 D | F = 2.00 D | F = 2.00 D |
| G = 0.50 D | G = 0.583 D | G = 0.667 D | G = 0.745 D |
| H = 1.00 D | H = 1.167 D | H = 1.333 D | H = 1.491 D |
| R = 0.50 D | R = 0.50 D | R = 0.50 D | R = 0.50 D |
| L = 3.041 D | L = 3.172 D | L = 3.317 D | L = 3.464 D |
| V = 1.88 D3 | V = 1.93 D3 | V = 1.98 D3 | V = 2.04 D3 |

*ID up to 12", OD − 2 wall thickness in 14" and larger.

From the foregoing description of one embodiment of this invention by way of example, it will be seen that this invention is one well adapted to attain all of the ends and objects hereinabove set forth, together with other advantages which are obvious and which are inherent to the apparatus and structure.

I claim:

1. A pipeline pig adapted to be inserted into a pipeline and to be propelled therethrough by fluid flowing through the pipeline comprising a body having two longitudinally spaced seal elements adapted to engage a wall of a pipeline when the pig is inserted thereinto, at least one of said elements being a section of a hollow sphere having a diameter substantially that of the pipeline in which the pig is to be used and providing an effective zone for peripheral contact with the inner pipeline wall extending sufficiently to either side of a plane normal to the longitudinal axis of the body so as to maintain a continuous peripheral contact of the sphere sections with the inner pipeline wall when the pig traverses a curved section of the pipeline, said seal elements each terminating at substantially the edges of said zone thereon so that said elements are each essentially a double truncated sphere, said pig having means in addition to said seal elements for limiting flow through the pig internally thereof.

2. The pig of claim 1 wherein said body has a central body portion extending between the sphere sections and connected thereto at approximately one edge of said zone with the sphere section at the other edge of said zone being free so that said sphere section tends to conform to out-of-round portions of the pipeline.

3. The pig of claim 2 wherein each of said elements is a section of a hollow sphere as aforesaid and wherein said central body portion is connected to said sphere sections so that said free edges of said sphere sections extend in opposite directions from each other.

4. A pipeline pig adapted to be inserted into a pipeline and to be propelled therethrough by fluid flowing through the pipeline and also adapted to pass through a curved section of the pipeline comprising an elongated central body portion of the known maximum lateral dimension, a pair of spaced apart seal elements each attached to the central body portion and each being a section of a hollow sphere having a diameter substantially that of the pipeline in which the pig is to be used and providing an effective zone for peripheral contact with the inner pipeline wall extending sufficiently to either side of a plane normal to the longitudinal axis of the body so as to maintain a continuous peripheral contact of the sphere sections with the inner pipeline wall when the pig traverses a curved section of the pipeline, said seal elements each terminating at substantially the edges of said zone thereon so that said elements are each essentially a double truncated sphere, said pig having means in addition to said seal elements for limiting flow through the pig internally thereof, the spacing of said seal elements from each other being sufficiently short that said central body portion is maintained out of contact with said pipeline when said pig traverses said curved section, and wherein said maximum lateral dimension of said central body portion midway between the centers of said sphere sections is less than the radial distance between the centerline of the body and the wall of the pipeline having the shortest radius of curvature.

5. The pig of claim 4 wherein said central body portion is hollow and sealed from intrusion of pipeline fluid thereinto and wherein said maximum lateral dimension is adjusted to give the pig substantial displacement of pipeline fluid to increase its buoyancy therein.

* * * * *